US007913236B2

(12) United States Patent
Adl-tabatabai et al.

(10) Patent No.: US 7,913,236 B2
(45) Date of Patent: Mar. 22, 2011

(54) METHOD AND APPARATUS FOR PERFORMING DYNAMIC OPTIMIZATION FOR SOFTWARE TRANSACTIONAL MEMORY

(75) Inventors: Ali-Reza Adl-tabatabai, Santa Clara, CA (US); Vijay Menon, Seattle, WA (US); Richard L. Hudson, Florence, MA (US); Bratin Saha, San Jose, CA (US); Tatiana Shpeisman, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 1173 days.

(21) Appl. No.: 11/540,817

(22) Filed: Sep. 29, 2006

(65) Prior Publication Data
US 2008/0098374 A1    Apr. 24, 2008

(51) Int. Cl.
*G06F 9/45* (2006.01)
(52) U.S. Cl. .................. 717/140; 717/148; 717/151
(58) Field of Classification Search .................. 717/140, 717/148, 151; 707/10
See application file for complete search history.

(56) References Cited

U.S. PATENT DOCUMENTS

| | | | |
|---|---|---|---|
| 5,404,525 A * | 4/1995 | Endicott et al. ................ 717/108 |
| 5,515,536 A * | 5/1996 | Corbett et al. ................ 719/315 |
| 5,761,670 A * | 6/1998 | Joy ........................................ 1/1 |
| 6,092,097 A * | 7/2000 | Suzuoka ........................ 709/201 |
| 6,182,282 B1 * | 1/2001 | Stoodley et al. .............. 717/116 |
| 6,223,340 B1 * | 4/2001 | Detlefs .......................... 717/145 |
| 6,438,560 B1 * | 8/2002 | Loen ........................................ 1/1 |
| 6,925,638 B1 * | 8/2005 | Koved et al. .................. 717/155 |
| 7,089,272 B1 * | 8/2006 | Garthwaite et al. .................. 1/1 |
| 2002/0038301 A1 * | 3/2002 | Aridor et al. ..................... 707/10 |
| 2002/0104077 A1 * | 8/2002 | Charnell et al. .............. 717/162 |
| 2004/0010664 A1 * | 1/2004 | Cierniak ........................ 711/152 |
| 2005/0262522 A1 * | 11/2005 | Gassoway ..................... 719/331 |
| 2006/0235837 A1 * | 10/2006 | Chong et al. ....................... 707/4 |
| 2007/0169030 A1 * | 7/2007 | Tarditi et al. .................. 717/140 |
| 2007/0198979 A1 * | 8/2007 | Dice et al. ..................... 718/100 |
| 2007/0240135 A1 * | 10/2007 | Stoodley et al. .............. 717/140 |
| 2008/0005112 A1 * | 1/2008 | Shavit et al. ..................... 707/8 |

OTHER PUBLICATIONS

Cierniak et al. (Intel Corp) "Practicing JUDO: Java Under Dynamic Optimizations", ACM, 2000, (Cierniak.pdf).*
Grcevski et al. "JIT compiler and Virtual Macnine improvement for server and middleware applications", IDM 2004, (Grcevski.pdf).*
Harris et al. "Optimizing Memory Transactions" Microsoft, Jun. 2006, (Harris.pdf).*
Herlihy et al., "Software Transactional Memory for Dynamic-Sized Data Structure", Brown University, ACM Jul. 2003, (Herlihy.pdf).*

* cited by examiner

*Primary Examiner* — Emerson C Puente
*Assistant Examiner* — Hiren Patel
(74) *Attorney, Agent, or Firm* — L. Cho

(57) ABSTRACT

A method for managing a transaction includes determining that an optimistically immutable field in the transaction is written to. Invaliding a method in response to determining that the method in the transaction reads is the optimistically immutable field.
Other embodiments are disclosed and claimed.

13 Claims, 9 Drawing Sheets

METHOD AND APPARATUS FOR PERFORMING DYNAMIC OPTIMIZATION FOR SOFTWARE TRANSACTIONAL MEMORY

FIELD

An embodiment of the present invention pertains to software transactional memory (STM). More specifically, an embodiment of the present invention relates to a method and apparatus for performing dynamic optimization for STM.

BACKGROUND

STM is a concurrency control mechanism analogous to database transactions for controlling access to shared memory in concurrent computing. It functions as an alternative to lock-based synchronization, and is typically implemented in a lock-free way. A transaction in this context is a piece of code that executes a series of reads and writes to shared memory. These reads and writes logically occur at a single instant in time. Immediate states are not visible to other transactions.

STM may use read barriers to mediate access to shared memory locations such as object fields and class fields. The read barriers allow STM to detect when fields are read in a transaction while being written to in another transaction. Read barriers involve execution of additional instructions which can adversely impact the performance of a program.

Attempts to improve STM techniques in the past involved performing immutable field optimization. Immutable fields are fields that are not modified once an object has been initialized. Fields may refer to object field or static (class) fields. An STM system can improve performance significantly by avoiding the overheads of utilizing read barriers on accesses to immutable fields.

Immutable field optimization, however, rely on explicit "final" annotations by a programmer or knowledge of which standard classes are immutable. Many other fields are implicitly final because they are never updated after object initialization. While a compiler can be configured to detect such fields through whole program analysis, languages that allow dynamic class loading, such as Java, make whole program analysis infeasible.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

Figure 1:
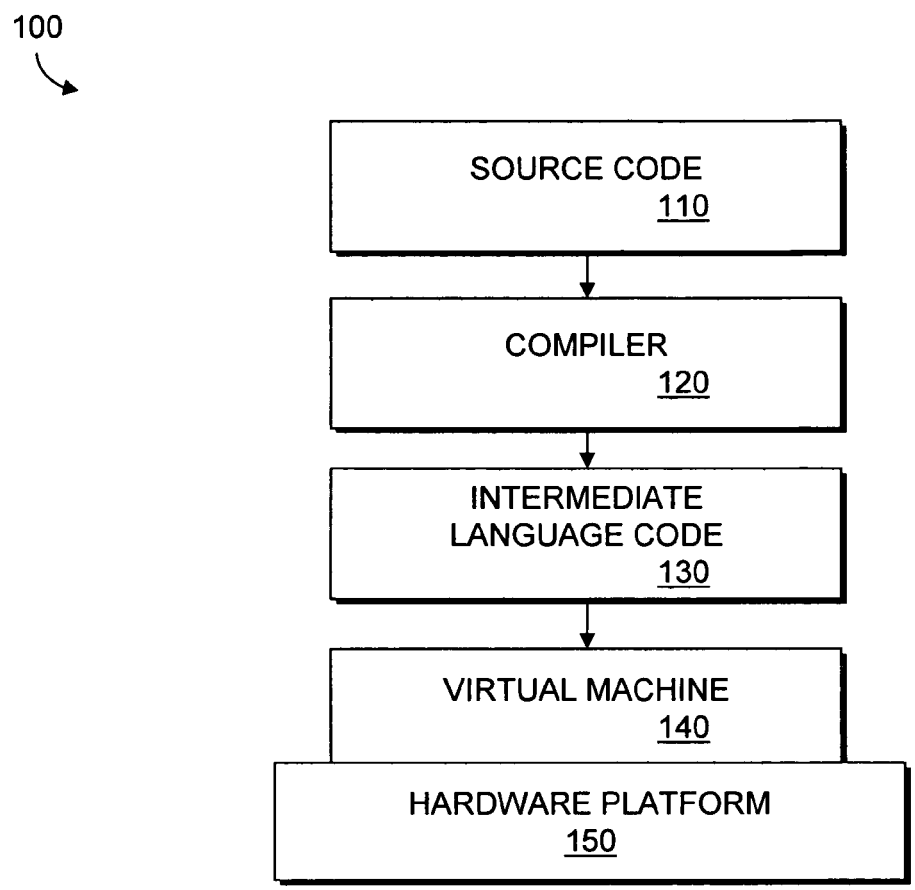
FIG. 1 is a block diagram of a software compilation and execution system according to an exemplary embodiment of the present invention.

FIG. 1 illustrates a software program compilation and execution system 100 according to an embodiment of the present invention. The software program compilation and execution system 100 includes a compiler 120 that compiles source code 110 into an intermediate language code 130. The source code 110 may be, for example, Java. The intermediate language code 130 may be, for example, Java byte-code or Common Intermediate Language code. According to an embodiment of the present invention, the compiler 120 is a software system that is run on a computer system and the intermediate language code 130 is stored in a memory of the computer system, a hard drive, or downloaded from an external source.

The software program compilation and execution system 100 includes a virtual machine 140 and a hardware platform 150. The virtual machine 140 further compiles the intermediate language code 130 into native code. According to an embodiment of the present invention, native code is machine code that is particular to a specific architecture or platform. The virtual machine 140 may be implemented as a software system. In this embodiment, the virtual machine 140 runs on the hardware platform 150. The virtual machine 140 may be, for example, a Java virtual machine, a small talk runtime system, or other runtime system. Alternatively, the virtual machine 140 may be implemented using other techniques (e.g., as a firmware system).

The hardware platform 150 executes the native code compiled by the virtual machine 140. The hardware platform 150 may be implemented, for example, by a personal computer, a personal digital assistant, a network computer, a server computer, a notebook computer, a workstation, a mainframe computer, or a supercomputer. Alternatively, the hardware platform 150 may be implemented by any other electronic system with data processing capabilities. The intermediate language code 130 may be delivered to the hardware platform 150 via a communication link such as a local area network, the Internet, or a wireless communication network.

Figure 2:
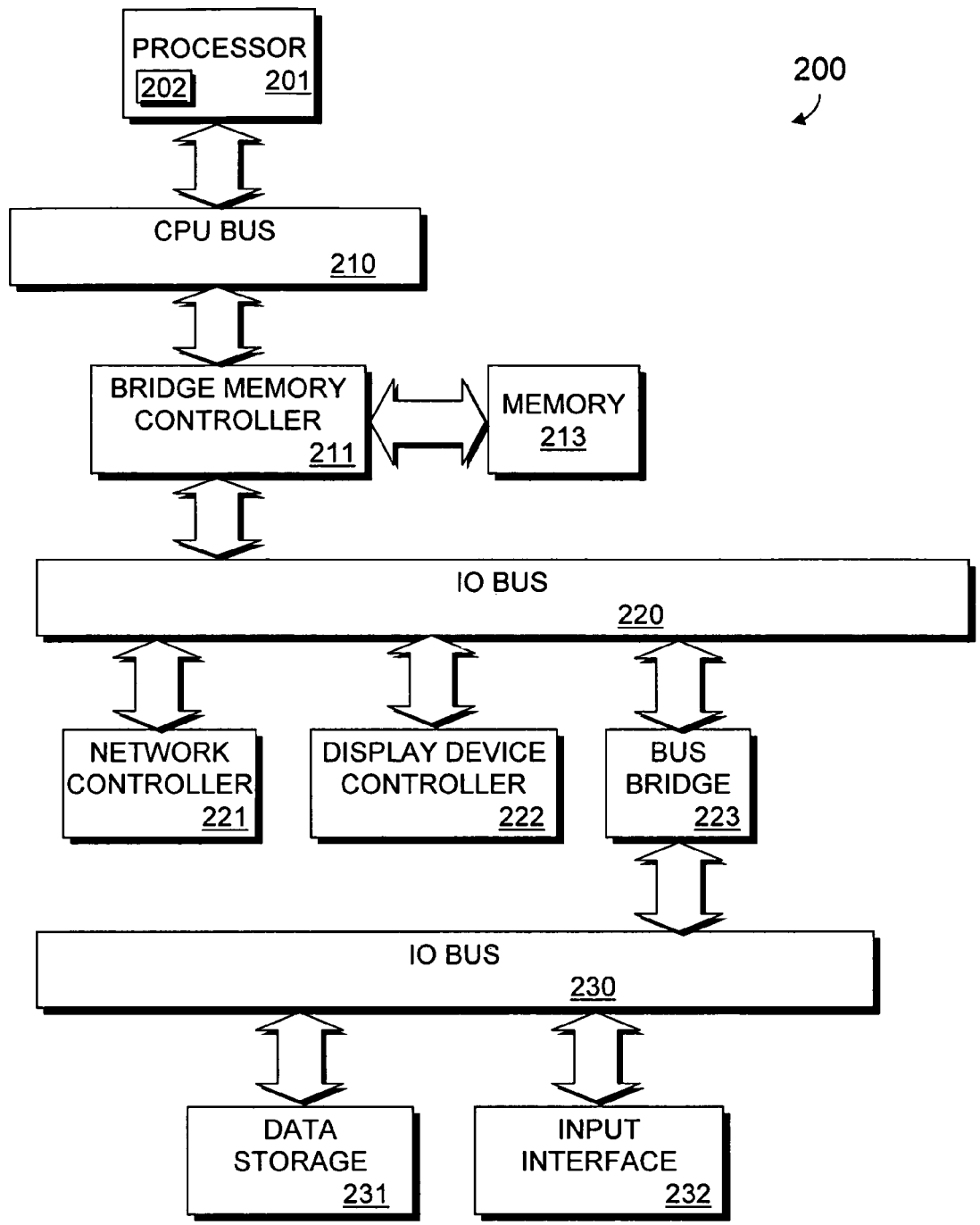
FIG. 2 is a block diagram of a hardware platform according to an exemplary embodiment of the present invention.

FIG. 2 is a block diagram of an exemplary computer system 200 according to an embodiment of the present invention. The computer system 200 may be used to implement the hardware platform 150 shown in FIG. 1. The computer system 200 includes a processor 201 that processes data signals. The processor 201 may be a complex instruction set computer microprocessor, a reduced instruction set computing microprocessor, a very long instruction word microprocessor, a processor implementing a combination of instruction sets, or other processor device. FIG. 2 shows the computer system 200 with a single processor. However, it is understood that the computer system 200 may operate with multiple processors. The processor 201 is coupled to a CPU bus 210 that transmits data signals between processor 201 and other components in the computer system 200. According to an embodiment of the present invention, the processor 201 may implement thread-level-parallelism to increase utilization of processor execution resources. By utilizing simultaneous multi-threading technology, multiple threads of software applications may be run simultaneously on the processor 201.

The computer system 200 includes a memory 213. The memory 213 may be a dynamic random access memory device, a static random access memory device, read only memory, and/or other memory device. The memory 213 may store instructions and code represented by data signals that may be executed by the processor 201. A cache memory 202 resides inside processor 201 that stores data signals stored in memory 213. The cache 202 speeds up memory accesses by the processor 201 by taking advantage of its locality of access. In an alternate embodiment of the computer system 200, the cache 202 resides external to the processor 201. The processor 201 may use a store buffer (not shown) to hold data to be written into the cache memory 202 in preparation for depositing it into memory 213.

A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first input output (IO) bus 220.

The first IO bus 220 may be a single bus or a combination of multiple buses. The first IO bus 220 provides communication links between components in the computer system 200. A network controller 221 is coupled to the first IO bus 220. The network controller 221 may link the computer system 200 to a network of computers (not shown) and supports communication among the machines. A display device controller 222 is coupled to the first IO bus 220. The display device controller 222 allows coupling of a display device (not shown) to the computer system 200 and acts as an interface between the display device and the computer system 100.

A second IO bus 230 may be a single bus or a combination of multiple buses. The second IO bus 230 provides communication links between components in the computer system 200. A data storage device 231 is coupled to the second IO bus 230. The data storage device 231 may be a hard disk drive, a floppy disk drive, a CD-ROM device, a flash memory device or other mass storage device. An input interface 232 is coupled to the second IO bus 230. The input interface 232 may be, for example, a keyboard and/or mouse controller or other input interface. The input interface 232 may be a dedicated device or can reside in another device such as a bus controller or other controller. The input interface 232 allows coupling of an input device to the computer system 200 and transmits data signals from an input device to the computer system 200. A bus bridge 223 couples the first IO bus 220 to the second IO bus 230. The bus bridge 223 operates to buffer and bridge data signals between the first IO bus 220 and the second IO bus 230.

Figure 3:
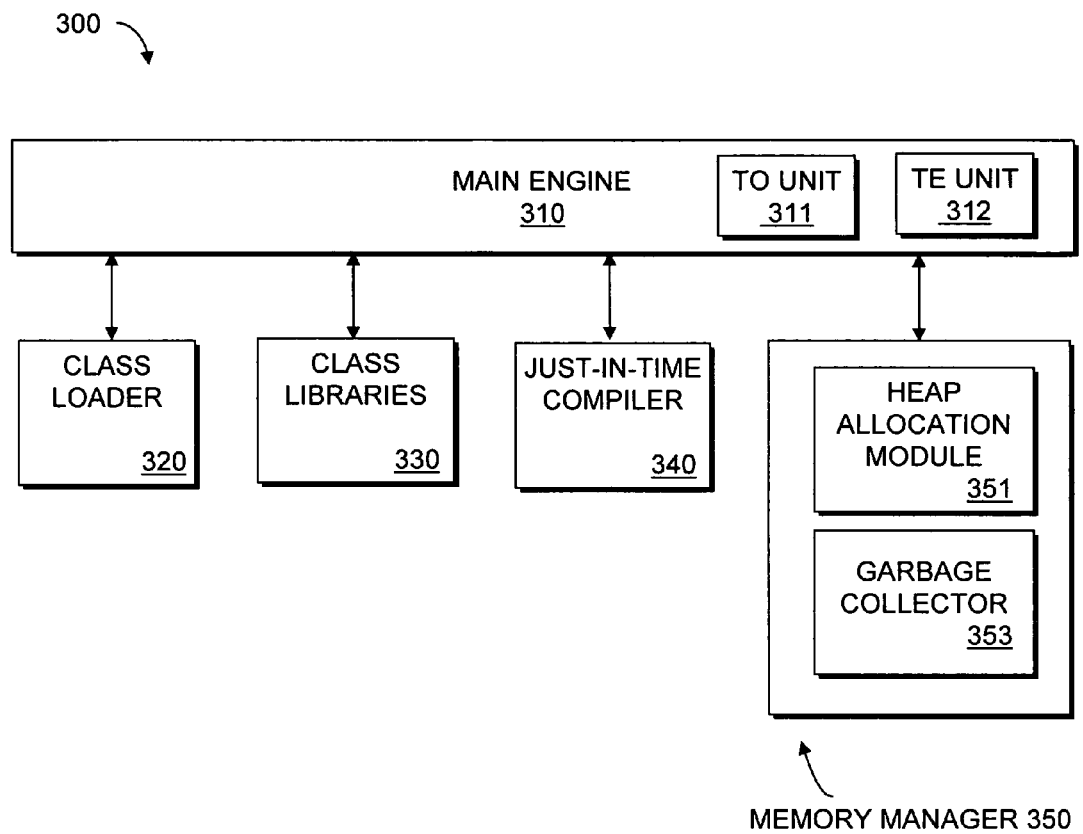
FIG. 3 is a block diagram of a virtual machine according to an exemplary embodiment of the present invention.

FIG. 3 is a block diagram of a virtual machine 300 according to an embodiment of the present invention. The virtual machine 300 maybe implemented as the virtual machine 140 shown in FIG. 1. The virtual machine 300 includes a main engine 310. The main engine 310 may be employed as the main core of the virtual machine 300. The main engine 310 monitors compilation and execution of the intermediate language code, and coordinates use of other modules in the virtual machine 300 when required. The main engine 310 also supports software transaction memory to allow instructions in a transaction to be seen logically as executing in the same instance of time.

According to an embodiment of the virtual machine 300, the main engine includes a transaction optimization (TO) unit 311. The transaction optimization unit 311 keeps track of the status of object and class fields in a transaction. According to one embodiment, the transaction optimization unit 311 keeps track of whether each field is optimistically immutable. A field may be optimistically immutable if the virtual machine 300 believes that the field is immutable based upon the processed byte code. The optimization unit 311 also keeps track of methods that read fields that are optimistically immutable. The transaction optimization unit 311 invalidates methods corresponding to an optimistically immutable field in response to determining that the field has been written to and is therefore not immutable.

The virtual machine 300 includes a class loader 320. The class loader 320 may be used to load classes. The class loader 320 may also perform other functions associated with loading classes. For example, the class loader 320 may also verify loaded classes.

The virtual machine 300 includes class libraries 330. The class libraries 330 may be used to store shared classes when a program may include more than one type of class, (i.e., application-specific class and shared class).

The virtual machine 300 includes a just-in-time compiler 340. The just-in-time compiler 340 may compile intermediate language code to generate native or machine code at runtime that is executed by a hardware According to an embodiment of the present invention, "just-in-time" refers to the just-in-time compiler 340 compiling or translating each method or class when it is used for execution into native code. The just-in-time compiler 340 may also store some compiled native code in a just-in-time in-memory cache (not shown in FIG. 3). In this manner, the virtual machine 300 may re-use native code associated with a previously compiled method or object that is invoked or called more than once. According to an embodiment of the virtual machine 300, the just-in-time compiler 340 determines when an optimistically immutable field is written to by an instruction in a transaction and generates a notification to the transaction optimization unit 311. The just-in-time compiler 340 also determines when an optimistically immutable field is read by a method in the transaction and generates a notification to the transaction optimization unit 311.

The virtual machine 300 includes a memory manager 350. The memory manager 350 may be used to manage a specific memory space within the memory referred to as heap or heap space. The memory manager 350 includes a heap allocation module 351 and a garbage collector 353. The heap allocation module 351 is used to allocate objects from the heap space in the memory. The garbage collector 353 is used to reclaim memory space in the heap used by objects that are no longer referenced by an application or method. Additionally, the garbage collector 353 also may move objects to reduce heap fragmentation. The memory manager 350 interacts with the main engine 310 and the just-in-time compiler 340.

The main engine 310, class loader 320, class libraries 330, just-in-time compiler 340, and memory manager 350 may be implemented using any known technique or circuitry. It should be appreciated that other components may also be implemented in the virtual machine 300. The transaction optimization unit 311 is shown to reside inside the main engine 310. It should also be appreciated that the transaction optimization unit 311 may reside elsewhere in the virtual machine 300 outside the main engine 310.

Figure 4:
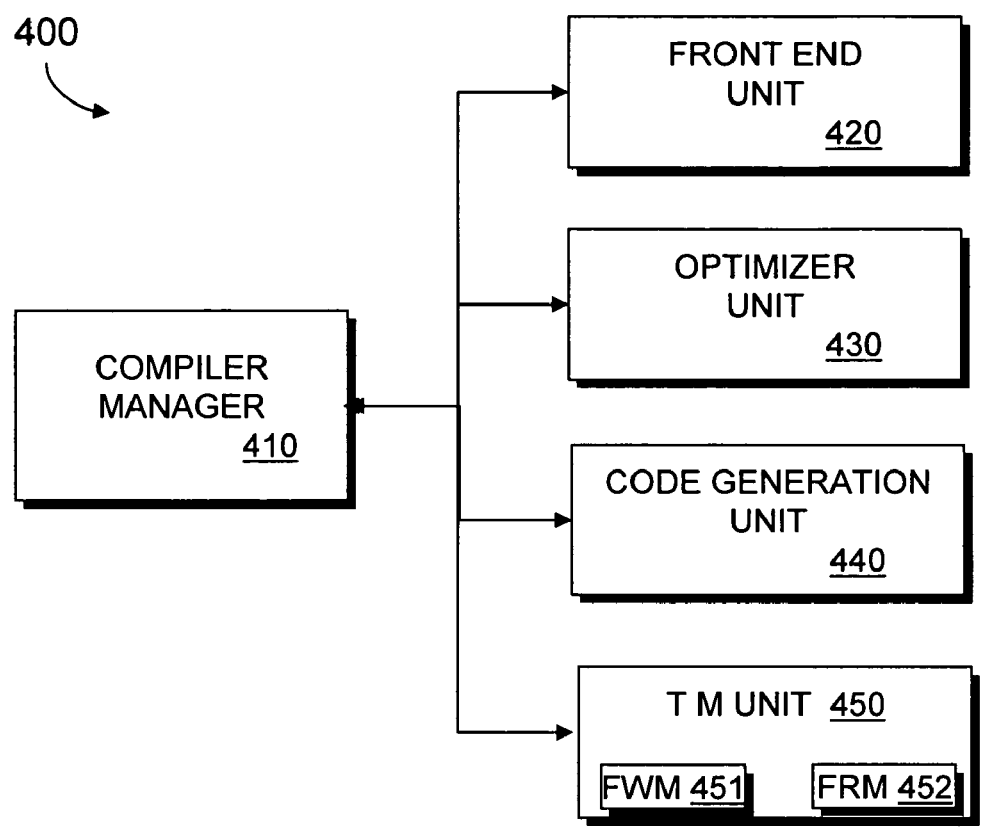
FIG. 4 is a block diagram of a just-in-time compiler according to an exemplary embodiment of the present invention.

FIG. 4 is a block diagram of a just-in-time compiler 400 according to an embodiment of the present invention. The just-in-time compiler 400 may be used to implement the just-in-time compiler 340 shown in FIG. 3. The just-in-time compiler 400 includes a compiler manager 410. The compiler manager 410 receives intermediate language code, such as Java byte-code or Common Intermediate Language code, to compile. The compiler manager 410 interfaces with and transmits information between other components in the just-in-time compiler 400.

The just-in-time compiler 400 includes a front end unit 420. According to an embodiment of the just-in-time compiler 400, the front end unit 420 operates to parse the intermediate language code and to convert it to an abstract syntax tree.

The just-in-time compiler 400 includes an optimizer unit 430. The optimizer unit 430 may utilize one or more optimization procedures to optimize the intermediate language code. According to an embodiment of the just-in-time compiler 400, the optimizer unit 430 may perform peephole, local, loop, global, interprocedural and/or other optimizations.

The just-in-time compiler 400 includes a code generator unit 440. The code generator unit 440 converts the intermediate representation into machine or assembly code that is native to a local processor.

The just-in-time compiler 400 includes a transaction monitor (TM) unit 450. The transaction monitor unit 450 includes a field write monitor (FWM) 451. The field write monitor 451 identifies writes to a field in a transaction. Upon determining that the field is optimistically immutable, the field write monitor 451 generates a notification that code in the transaction writes to the field. The transaction monitor unit 450 also includes a field read monitor. The field read monitor (FRM) 452 identifies reads of a field in a transaction. Upon determining that the field is optimistically immutable, the field read monitor 452 generates a notification that a compiled method reads this optimistic immutable field in a transaction.

The just-in-time compiler 400 is shown to be implemented with a compiler manager 410, front end unit 420, optimizer unit 430, code generation unit 440, and transaction monitor unit 450. It should be appreciated that the just-in-time compiler 400 may be implemented with a subset of the components described with reference to FIG. 4. It should also be appreciated that other components may reside in the just-in-time compiler 400.

Figure 5:
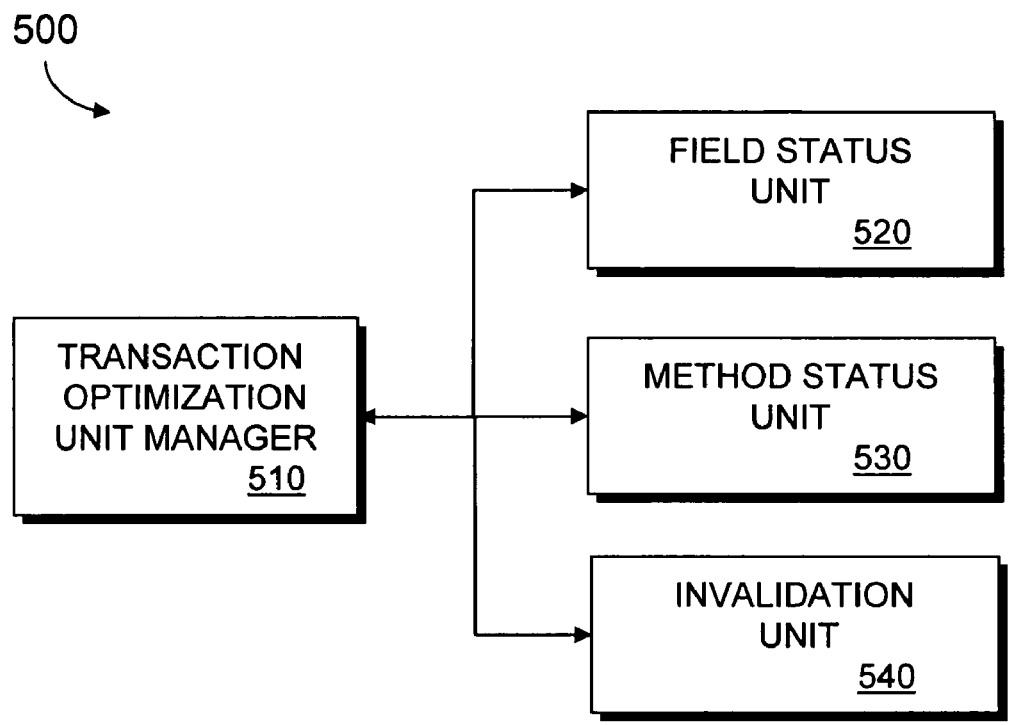
FIG. 5 is a block diagram of a transaction optimization unit according to an exemplary embodiment of the present invention.

FIG. 5 is a block diagram of a transaction optimization unit 500 according to an exemplary embodiment of the present invention. The transaction optimization unit 500 may be used to implement the transaction optimization unit 311 shown in FIG. 3. The transaction optimization unit 500 includes a transaction optimization unit manager 510. The transaction optimization unit manager 510 is coupled to and transmits information between components in the transaction optimization unit 500.

The transaction optimization unit 500 includes a field status unit 520. The field status unit 520 maintains a list of optimistically immutable fields. According to an embodiment of the transaction optimization unit 500, all fields may be initially assumed to be optimistically immutable. Alternatively, a field may be determined to be optimistically immutable after one or more methods are inspected to confirm that there are no instructions to write to the field. The field status unit 520 may for example implement a method, is FieldOptimistic(F), that returns true if field F is optimistically immutable and false otherwise. The field status unit 520 may implement this method to check if its list of optimistically immutable fields contains field F. It should be appreciate that other data structures may be implemented to track the status of a field. For example, instead of maintaining a list of immutable fields, status field unit 520 may maintain a per-field flag to indicate whether a field is currently optimistically immutable. The field status unit 520 updates its list of optimistically immutable fields upon receiving a notification from a just-in-time compiler that a particular field has been written. The notification may be in the form of a call, such as for example, fieldWritten(F), supported by an API function.

The transaction optimization unit 500 includes a method status unit 530. The method status unit 530 maintains lists of methods that read optimistically immutable fields. For example, each field, F, may have a corresponding list of methods, OptimisticMethods(F), that read from optimistically immutable field F. The method status unit 530 updates its list of methods upon receiving notification from a just-in-time compiler that a particular method is reading an optimistically immutable field. The notification may be in the form of a call, such as for example, fieldOptimisticallyRead(F). The method status unit 530 may delete a list of methods corresponding to an optimistically immutable field upon determining that the field has been written to and is no longer optimistically immutable.

The transaction optimization unit 500 includes an invalidation unit 540. The invalidation unit 540 manages a virtual method table that includes pointers to a location in memory where compiled code for a method resides or that includes a compilation stub (an instruction or a pointer to an instruction to compile code.) The invalidation unit 540 invalidates a method in response to determining that an optimistically immutable field F has been written to. According to an embodiment of the transaction optimization unit 500, the invalidation unit 540, identifies one or more methods that read the optimistically immutable field that has been written to and indicates on a virtual table that the method is to be re-compiled. In one embodiment, re-compiling involves compiling the method with a read barrier. According to an embodiment of the present invention, the invalidation unit 540 does this by replacing a virtual table entry corresponding to the method with a compilation stub. Next, invocation of the method will result in execution of the compilation stub and recompilation of the method. The recompiled method may include a read barrier for reads of field F because that filed is no longer optimistically immutable. The invalidation unit 540 may lock the virtual method table while it is writing to it and write a new version number for the virtual method table after removing the lock.

The transaction optimization unit 500 is shown to be implemented with a transaction optimization unit manager 510, field status unit 520, method status unit 530, and an invalidation unit 540. It should be appreciated that the transaction optimization unit 500 may be implemented with a subset of the components illustrated in FIG. 5. It should also be appreciated that other components may reside in the transaction optimization unit 500.

According to an embodiment of the present invention, a just-in-time compiler detects fields that are implicitly final in the presence of dynamic loading. The just-in-time compiler makes optimistic assumption about fields based on its current, incomplete view of compiled code. A transaction optimization unit invalidates those assumptions if new code is compiled that writes to a field that the just-in-time compiler assumed was immutable. The transaction optimization unit invalidates code generated based on the invalid assumptions, which causes threads that may be executing such code to abort.

Referring back to FIG. 3, the main engine 310 includes a transaction execution (TE) unit 312. The transaction execution unit 312 compares a version number of a virtual table accessed during execution of instructions in a transaction with the version number of a virtual table after execution of the instruction sin the transaction. The transaction execution unit 312 undoes the instructions in the transaction upon determining that the version number has changed. It should be appreciated that the transaction execution unit 312 may be implemented in other components of the virtual machine 300.

According to an embodiment of the present invention, STM guarantees that transactions execute if they were executing sequentially. An STM keeps track of reads and writes performed by a transaction. If the STM detects that two transactions are in conflict (the transactions access the same memory location and one of the accesses is a write), the STM aborts one of the two transactions. In one embodiment; each memory location is associated with a transaction record. The transaction record may include either a version number or an identifier of the tread that owns the transaction record. When a transaction reads data, it records the version number. When a transaction writes data, it acquires ownership of the transaction record. Before committing, a transaction checks if all the data that it read still has the same version number. This procedure is referred to as validation. If the version numbers of all data read is the same, the transaction is committed and ownership of all the data written is released by setting corresponding transaction records to the next version number. If the version numbers of all the data is not the same, the transaction aborts.

Figure 6:
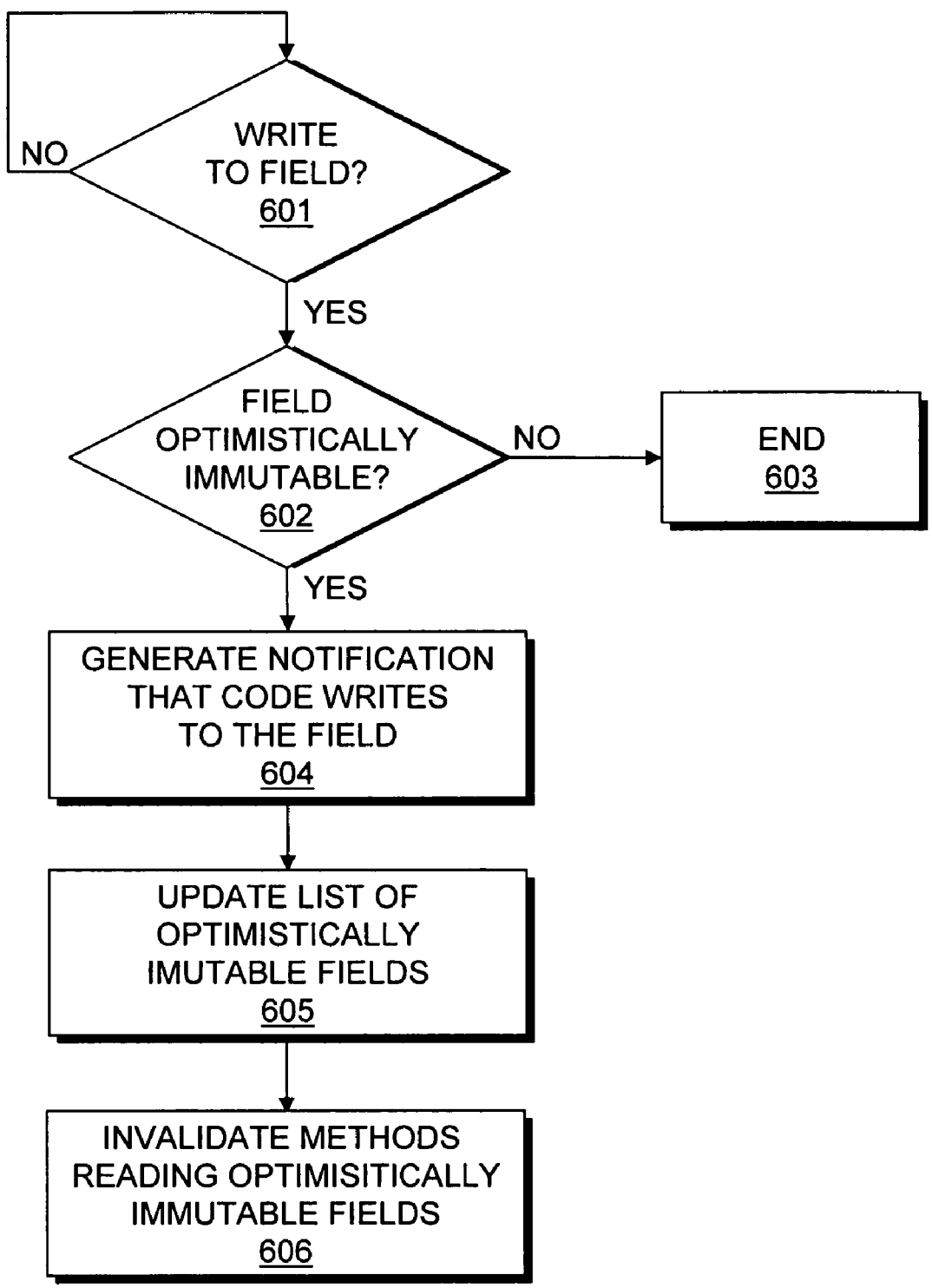
FIG. 6 is a flow chart illustrating a method for managing a field write according to an exemplary embodiment of the present invention.

FIG. 6 is a flow chart illustrating a method for managing a field read according to an exemplary embodiment of the present invention. At 601, a determination is made as to whether a write has been made to a field. The determination may be made, for example, by detecting a putfield or putstatic bytecode inside a transaction. According to one embodiment, writes inside constructors are considered outside of a transaction since the object is thread local while being constructed and thus is not considered as a write to the field. The determination may be made by a just-in-time compiler during compilation of intermediate language code. If it is determined that a write has been made to a field, control proceeds to 602. If it is determined that a write has not been made to a field, control returns to 601.

At 602, it is determined whether the field is optimistically immutable. According to an embodiment of the present invention, the determination may be made by having a just-in-time compiler query a field status unit in the transaction optimization unit. The just-in-time compiler may use an API function such as is FieldOptimistic(F) to determine whether the field written to is optimistically immutable. If the field is not optimistically immutable, control proceeds to 603. If the field is optimistically immutable, control proceeds to 604.

At 603, control terminates the process.

At 604, a notification is generated to indicate that an optimistically immutable field is written to. According to an embodiment of the present invention, a just-in-time compiler may utilize an API call such as fieldWritten(F) to signal to a transaction optimization unit that the optimistically immutable field has been written to and is thus no longer optimistically immutable.

At 605, a list of optimistically immutable fields is updated. According to an embodiment of the present invention, a field status unit in a transaction optimization unit may update the list of optimistically immutable field in response to the notification generated at 604.

At 606, the methods that read the optimistically immutable field are invalidated.

Figure 7:
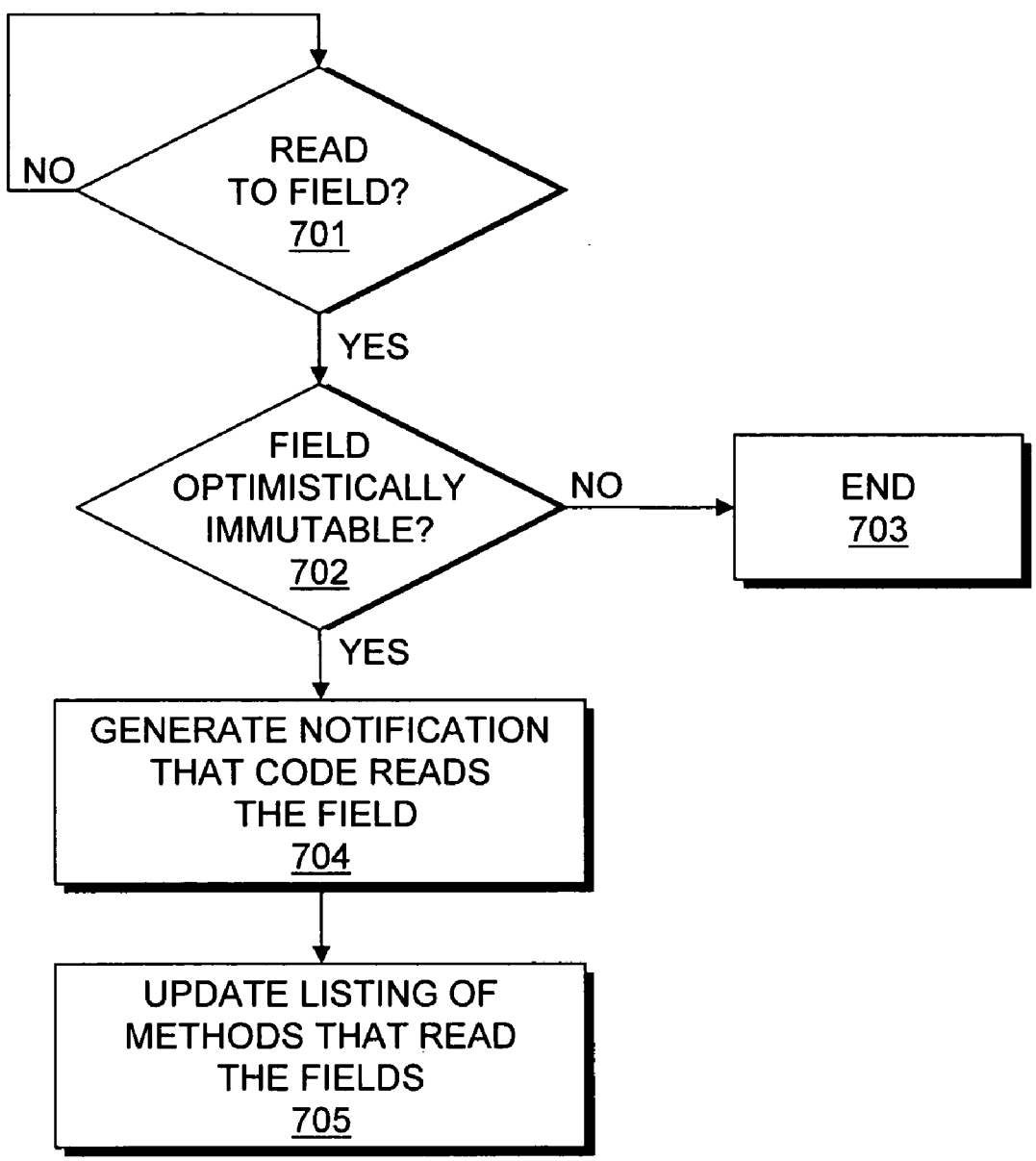
FIG. 7 is a flow chart illustrating a method for managing a read by a method according to an exemplary embodiment of the present invention.

FIG. 7 is a flow chart illustrating a method for managing a read in a method according to an exemplary embodiment of the present invention. At 701, a determination is made as to whether a read has been made to a field by a method. The determination may be made by a just-in-time compiler during compilation of intermediate language code. If it is determined that a read has been made to a field, control proceeds to 702. If it is determined that a read has not been made to a field, control returns to 701.

At 702, it is determined whether the field is optimistically immutable. According to an embodiment of the present invention, the determination may be made by having a just-in-time compiler query a field status unit in the transaction optimization unit. The just-in-time compiler may use an API function such as is FieldOptimistic(F) to determine whether the field written to is optimistically immutable. If the field is not optimistically immutable, control proceeds to 703. If the field is optimistically immutable, control proceeds to 704.

At 703, control terminates the process.

At 704, a notification is generated to indicate that an optimistically immutable field is read by the method. According to an embodiment of the present invention, a just-in-time compiler may utilize an API call such as fieldOptimisticallyRead(F) to signal to an transaction optimization unit that the optimistically immutable field has been read from.

At 705, a list of methods that read the optimistically immutable field is updated. According to an embodiment of the present invention, for each optimistically immutable field F, a set of compiled methods, OptimisticMethods(F), that read F inside a transaction is maintained. A method status unit in a transaction optimization unit may update the list of methods in response to the notification generated at 704.

Figure 8:
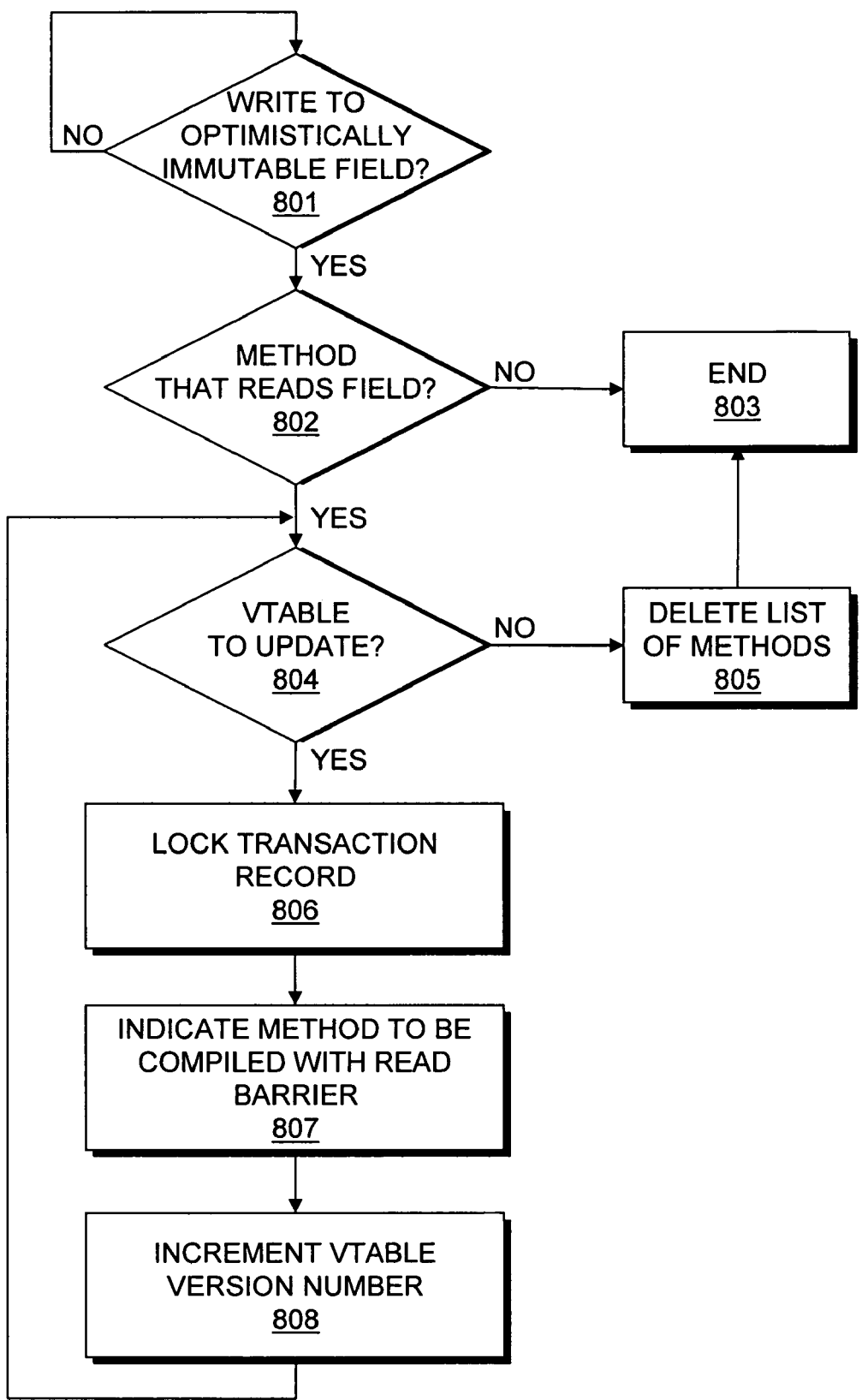
FIG. 8 is a flow chart illustrating a method for invalidating a method according to an exemplary embodiment of the present invention.

FIG. 8 is a flow chart illustrating a method for invalidating a method according to an exemplary embodiment of the present invention. The procedure described in FIG. 8 may be used to implement 606 in FIG. 6. At 801, it is determined whether there has been a write to an optimistically immutable field. If it is determined that there has been a write to an optimistically immutable field, control proceeds to 802. If it is determined that there has not been a write to an optimistically immutable field, control returns to 801.

At 802, it is determined whether there are any methods that read the optimistically immutable field. According to an embodiment of the present invention, for each optimistically immutable field F, a set of compiled methods, OptimisticMethods(F), that read F inside a transaction is maintained. The determination at 802 may be made by identifying whether there are any methods in OptimisticMethods(F). If it is determined that there is no method that reads the optimistically immutable field, control proceeds to 803. If it is determined that a method reads the optimistically immutable field, control proceeds to 804.

At 803, control terminates the procedure.

At 804, it is determined whether there are any additional virtual method tables (vtables) to update. Each virtual method table that includes an entry for a method that reads from the optimistically immutable field should be updated. If no additional virtual method tables need to be updated, control proceeds to 805. If one or more additional virtual method tables need to be updated, control proceeds to 806 to update a virtual method table.

At 805, the list of methods that read from the optimistically immutable field is deleted. According to an embodiment of the present invention, deletion occurs after virtual tables for all methods that read from the optimistically immutable field are re-written.

At 806, a transaction record to a virtual method table that is being updated is locked. According to an embodiment of the present invention, a transaction record is associated with each virtual table. Locking the transaction record prevents the virtual method table to be accessed during the update.

At 807, the entry corresponding to the method that reads from the optimistically immutable field is changed. According to an embodiment of the present invention, the entry is changed to indicate that the method is to be compiled with a read barrier.

At 808, a version number of the virtual method table is updated after it is unlocked.

Figure 9:
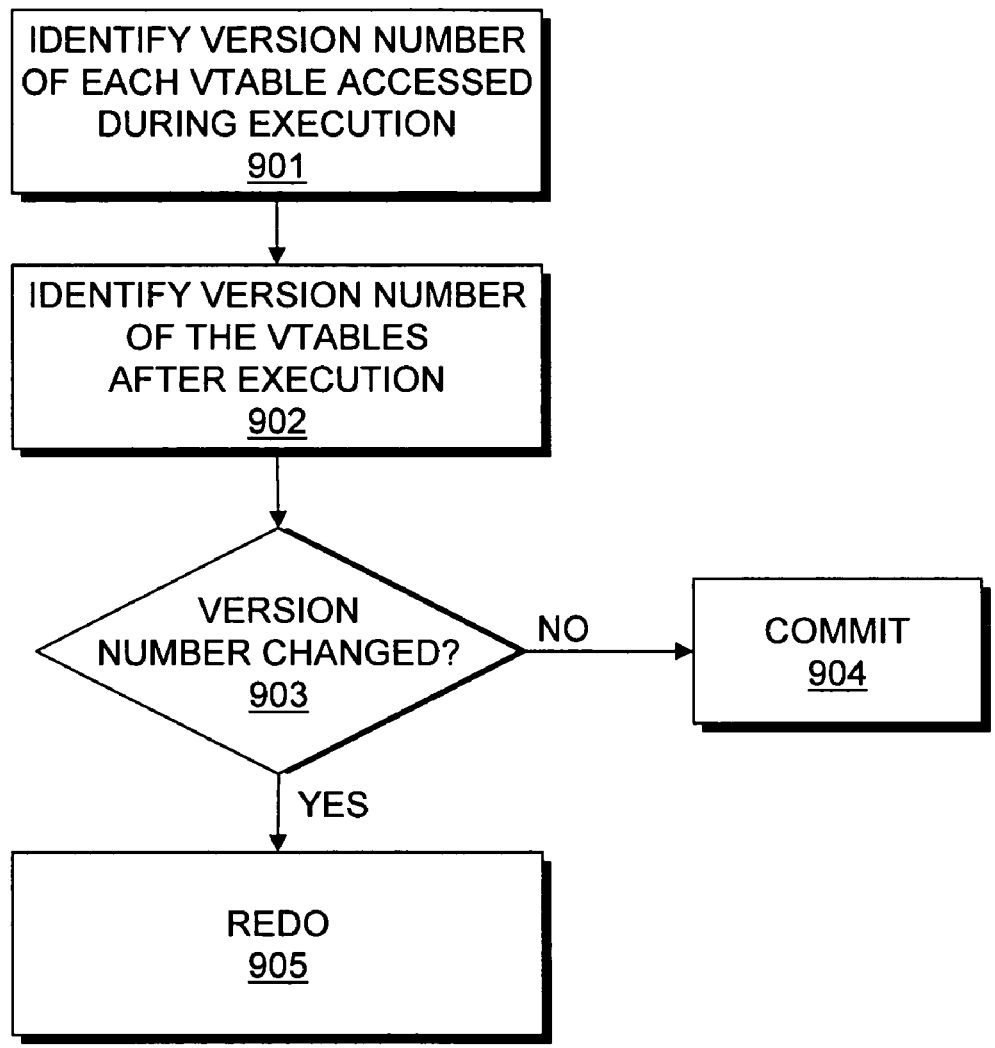
FIG. 9 is a flow chart illustrating a method for managing a method dispatch barrier according to an exemplary embodiment of the present invention.

FIG. 9 is a flow chart illustrating a method for managing a method dispatch barrier according to an exemplary embodiment of the present invention. At 901, a version number for each virtual method table (vtable) accessed during execution of a transaction is identified while being read.

At 902, the version number for each virtual method table accessed during execution of the transaction is identified after execution of the transaction is completed.

At 903, it is determined whether the version number of any virtual method table changed after execution of the transaction. If no version number for a virtual method table is found to have changed, control proceeds to 904. If a version number for a virtual method table is found to have changed, control proceeds to 905.

At 904, the instructions compiled are committed. It should be appreciated that compiled instructions may have other conflicts that cause the transaction to abort. In these situations, the instructions are not committed.

At 905, all of the instructions in the transaction are undone. The instructions are to be re-compiled. According to an embodiment of the present invention, when the instructions are re-compiled, the instructions are re-compiled with new assumptions that allow the instructions to be re-compiled with read barriers.

FIGS. 6, 7, 8 and 9 are flow charts illustrating methods according to exemplary embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention have been described with reference to specific exemplary embodiments thereof. It will, however, be evident that various modifications and changes may be made thereto without departing from the broader spirit and scope of the embodiments of the invention. For example, rather than keeping a transaction record for each virtual method table, a per-compiled method transaction record may be kept. In this embodiment, the prolog of an optimistically compiled method checks the transaction record and adds it to a read set. In another example, a virtual machine may keep a single global transaction record for all generated code. Each transaction read may check the single global transaction record and add it to a read set at the start of the transaction. The global transaction record is locked, incremented, and unlocked each time an optimistically compiled method M is invalided. All in-progress transactions are aborted regardless of whether they are called M. It should be appreciated that embodiments of the invention may be extended to support optimistically compiled transactional regions. Per-region transaction record may be kept and checked each time a region is executed. Compensation code is executed if a region is invalided. The embodiments of the invention may also be applied to class hierarchy analysis and to other optimistic optimization applications. The specification and drawings are, accordingly, to be regarded in an illustrative rather than restrictive sense.

What is claimed is:

1. A method for managing a transaction, comprising:
   determining that an optimistically immutable field in the transaction is written to;
   determining that a method in the transaction reads the optimistically immutable field;
   invalidating the method by locking a transaction record of a virtual table that points to the method, indicating on the virtual table that the method is to be re-compiled, and unlocking the transaction record and writing a new version number for the virtual table;
   identifying a version number of the virtual table accessed during execution of instructions in the transaction;
   identifying the new version number of the virtual table after execution of the instructions in the transaction; and
   aborting the transaction upon determining that the version number has changed.

2. The method of claim 1, further comprising maintaining a list of optimistically immutable fields.

3. The method of claim 1, further comprising:
   maintaining a list of optimistically immutable fields; and
   updating the list upon determining that an optimistically immutable field is written to.

4. The method of claim 1, further comprising:
   maintaining a list of optimistically immutable fields; and
   updating the list upon determining that an optimistically immutable field is written to, wherein determining that an optimistically immutable field is written to is achieved by receiving a call from a just-in-time compiler.

5. The method of claim 1, further comprising maintaining a list of methods that read an optimistically immutable field.

6. The method of claim 1, further comprising:
   maintaining a list of methods that read an optimistically immutable field; and
   updating the list of methods that read the optimistically immutable field upon determining that an optimistically immutable field is read by a method.

7. The method of claim 6, further comprising:
   maintaining a list of methods that read an optimistically immutable field; and
   updating the list of methods that read the optimistically immutable field upon determining that an optimistically immutable field is read by a method, wherein determining that the optimistically immutable field is read by a method is achieved by receiving a call from a just-in-time compiler.

8. An article of manufacture comprising a non-transitory machine accessible storage medium including sequences of instructions, the sequences of instructions including instructions which when executed cause the machine to perform:
   determining that an optimistically immutable field in a transaction is written to;
   determining that a method in the transaction reads the optimistically immutable field;
   invalidating the method by locking a transaction record of a virtual table that points to the method, indicating on the virtual table that the method is to be re-compiled, and unlocking the transaction record and writing a new version number for the virtual table;
   identifying a version number of the virtual table accessed during execution of instructions in a transaction;
   identifying the new version number of the virtual table after execution of the instructions in the transaction; and
   undoing the instructions upon determining that the version number has changed.

9. A virtual machine executed on a computer system, comprising:
   a just in time compiler operable to determine that an optimistically immutable field in a transaction is written to and operable to determine that a method in the transaction reads the optimistically immutable field;
   a transaction optimization unit operable to invalidate the method by locking a transaction record of a virtual table that points to the method, indicate on the virtual table that the method is to be re-compiled, and unlock the transaction record and writing a new version number for the virtual table; and
   a transaction execution unit operable to identify a version number of the virtual table accessed during execution of instructions in the transaction, identify the new version number of the virtual table after execution of the instructions in the transaction, and abort the transaction upon determining that the version number has changed.

10. The virtual machine of claim 9, wherein the transaction optimization unit includes a field status unit to maintain a list of optimistically immutable fields, and update the list upon determining that the optimistically immutable field is written to.

11. The virtual machine of claim 9, wherein the transaction optimization unit includes a method status unit to maintain a list of methods that read the optimistically immutable field, and update the list of methods that read the optimistically immutable field upon determining that the optimistically immutable field is read by a method.

12. The virtual machine of claim 9, wherein the just-in-time compiler includes:
   a transaction monitor unit having a field write monitor to generate a call indicating that the optimistically immutable field is written to by the instruction in the transaction.

13. The virtual machine of claim 12, wherein the transaction monitor unit further comprises a field read monitor to generate a call indicating that the optimistically immutable field is read by a method in the transaction.

* * * * *